Sept. 12, 1967 P. J. NIELAND ETAL 3,341,143

TAPE CARTRIDGE

Filed Aug. 5, 1964 2 Sheets-Sheet 1

INVENTORS
PAUL J. NIELAND
WILLIAM R. RASMUSSEN JR.
BY Merchant, Merchant & Gould
ATTORNEYS INVENTORS
PAUL J. NIELAND
WILLIAM R. RASMUSSEN JR.
BY Merchant, Merchant & Gould
ATTORNEYS 3,341,143
TAPE CARTRIDGE Paul J. Nieland, South St. Paul, and William R. Rasmussen, Jr., Minneapolis, Minn., assignors, by mesne assignments, to The Telex Corporation, Tulsa, Okla., a corporation of Delaware Filed Aug. 5, 1964, Ser. No. 387,696
1 Claim. (Cl. 242—55.19)

This invention relates generally to tape recording and playback machines, and more particularly, it relates to an improved tape cartridge for use with tape handling machines.

Although the present invention may be employed with various types of tape cartridges, it has particular reference with respect to magnetic tape cartridges of the type having an endless coil of tape in which a playing loop thereof is removed from the inner convolution of the tape coil and returned to the outer convolution thereof. Tape cartridges of the type referred to above generally comprise a housing in which a reel is mounted with the tape coil being wound on the reel for free rotation about a generally vertical axis. The tape coil is rotatably contained within a housing having spaced top and bottom walls and side walls, with one of the side walls having openings therein to permit communication of the playing loop of the tape with one or more electromagnetic transducer heads carried by the tape machine. The playing loop of the tape coil is transported across the transducer heads by means of a power driven capstan and a cooperating idle pressure roller swingably mounted for movements between a below deck inoperative position and an above deck operative position. Also, cartridges of the type referred to above usually have an aperture provided in the housing bottom wall through which the idle pressure roller is swung when the cartridge is placed upon the tape deck in its operative position.

The tape coil and reel in cartridges of the type noted above are usually freely rotatable about the reel axis to permit the playing loop of the tape to be easily driven by the capstan and pressure roller. However, it has become desirable to provide a braking mechanism for preventing movement of the playing loop and the tape coil when the cartridge is not retained by or placed upon the machine. This is particularly important during shipping and handling of the cartridges in order to prevent spillage and possibly entanglement of the tape.

While braking or tape retaining mechanisms have previously been devised for tape cartridges of the type noted above, the same have generally not provided optimum satisfaction since they have either not completely eliminated the tendency for tape spillage during shipment and handling, or they have been relatively expensive to manufacture. Previous braking mechanisms have usually been applied to the reel which carries the coil of tape and have therefore permitted the tape coil itself to continue movement although the movement of the reel may be halted. With this in mind, an important object of the present invention is the provision of a braking mechanism for tape cartridges wherein the braking mechanism is applied directly to the tape coil in order to stop the movement thereof upon release of the tape driving mechanism.

Another object of this invention is the provision of a novel braking mechanism for tape cartridges which comprises an elongated brake band disposed adjacent the outer convolution of the tape coil and extending in a generally arcuate configuration around a portion of the periphery of the coil, and wherein an actuating lever is provided for engagement by the idle pressure roller mechanism for disengaging the braking mechanism upon movement of the pressure roller to its operative position adjacent the capstan.

Another object of the present invention is the provision of a tape cartridge which includes a novel cartridge housing design wherein the cartridge top wall is provided with a plurality of elongated ribs which project downwardly to engage and align the edges of the coil of tape carried by the cartridge reel. Other objects of the present invention reside in the provision of a braking mechanism for a tape cartridge which is extremely simple in design so as to permit economical manufacture, but which provides an efficient braking action considerably more effective than previously known devices.

The above and still further objects and advantages of the present invention will become apparent from a consideration of the following detailed specification, appended claim and drawings.

Referring to the drawings, wherein like reference characters indicate like parts or elements throughout the several views.

Figures 1, 2:
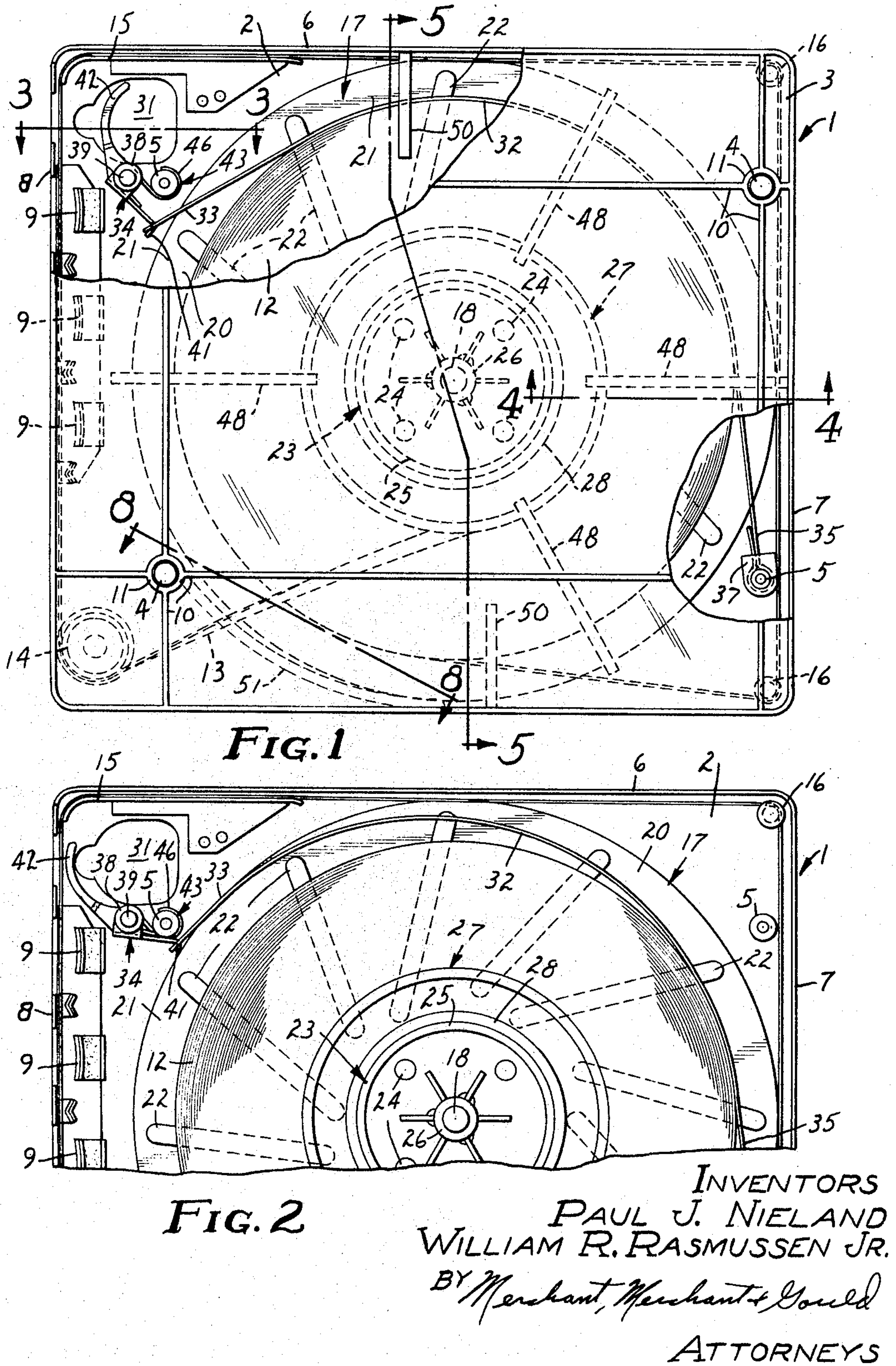
FIG. 1 is a view in top plan showing a tape cartridge according to the present invention, some parts being broken away.
FIG. 2 is a view in top plan of a portion of a cartridge shown in FIG. 1 with the top wall of the cartridge housing being removed.

The tape cartridge of the present invention is particularly adapted for use with tape handling machines of the type having a tape deck for supporting the cartridge and a power driven capstan and cooperating idle pressure roller for driving the tape across the electromagnetic transducer heads. The idle pressure roller is adapted to engage the side of the tape opposite that engaged by the capstan so as to maintain the tape in frictional driving engagement with the capstan, and means is provided for mounting the pressure roller for arcuate swinging movements toward and away from the capstan between an inoperative below-deck position and an operative above-deck position wherein the pressure roller presses the tape into driving engagement with the capstan. Since the particular construction of the tape handling machine in itself is not a feature of the present invention, the same is not then shown in the drawings and further description thereof will be omitted, it being noted that a tape recording and playback machine of the type noted above is shown and described in detail in U.S. Patent No. 3,096,-920, issued on July 9, 1963.

The tape cartridge of the present invention comprises a housing, represented in its entirety by the reference numeral 1, which may be suitably made from any of the rigid materials such as plastic or sheet metal for example. The housing 1 includes a bottom wall 2 and top wall 3 which is removably secured in vertically spaced generally parallel relationship above the bottom wall 2 by means of a plurality of screws 4, which are received within vertically aligned studs 5, projecting upwardly from the bottom wall 2. The housing 1 further includes side walls 6, a front wall 7 and a rear wall 8. It will be noted that portions of the rear wall 8 are cut away so as to define openings therein to permit the reception of the transducer heads and the capstan, not shown. A plurality of resilient backup pads 9 are positioned above the housing bottom wall 2 opposite the openings in the housing rear wall 8 for supporting the tape opposite the transducer heads, not shown. The top wall 3 of the cartridge housing 1 defines a plurality of upwardly projecting ribs 10 which are arranged in a generally rectangular pattern and intersect to define bosses 11 for reinforcing the apertures which receive the screws 4.

The cartridge of the present invention contains an endless coil of tape 12 in which a playing loop 13 thereof is removed from the inset of the coil by the pulling action of the power driven capstan, not shown, and it is returned to the perimeter of the freely rotating coil 12. The playing loop 13 comes away from the inner convolution of the tape coil and is entrained partially around an idle corner pulley 14 after which it extends across the housing rear wall 8 where it is entrained around an elongated guide flange 15 disposed at the opposite corner of the housing. The playing loop 13 is further entrained around a pair of guide pins 16 located at the front of the cartridge housing before it is returned to the perimeter or outer convolution of the tape coil 12.

Figure 5:
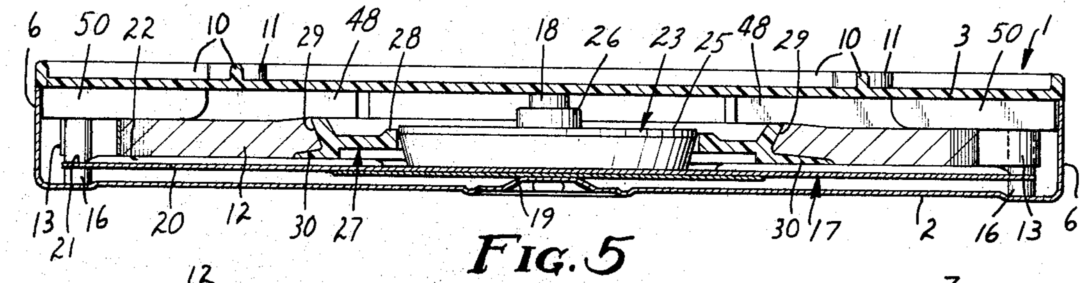
FIG. 5 is an enlarged view in vertical section taken on the line 5—5 of FIG. 1.

The cartridge further comprises a reel 17 mounted within the housing 1 on a generally centrally disposed vertically extending spindle 18 which is rigidly secured in an impressed portion 19 of the housing bottom wall 2, as shown particularly in FIG. 5. The reel 17 comprises a circular turntable 20 which is mounted for generally free rotation about the spindle 18, and the turntable 20 defines an upper surface 21 for supporting at least a portion of the endless coil of tape 12. The upper surface 21 of the turntable 20 defines a plurality of angularly outwardly extending ribs 22 upon which the coil of tape 12 is positioned. The tape reel 17 further comprises an annular hub 23 which is rigidly secured, as by rivets 24, to the turntable 20, and the annular hub 23 comprises a cylindrical outer portion 25 and an inner bearing portion 26 received for generally free rotation on the spindle 18.

The reel 17 further includes an annular core member 27 which is generally loosely received on the annular hub 23. The core member 27 comprises an upstanding annular inner portion 28, and also defines a generally upwardly and outwardly inclined generally frusto-conical surface 29 about which the coil of tape 12 is wound. The core member 27 further defines a generally circular disk-like flange 30 which extends generally horizontally outwardly under the inner convolutions of the tape coil 12, as shown particularly in FIGS. 4 and 5.

As shown in the drawings, the bottom wall 2 of the housing 1 defines an aperture 31 located adjacent the cartridge rear wall 8, which is adapted to receive the pressure roller, not shown, of the tape machine when the cartridge is located in its operative position upon the tape deck of the machine, not shown. The pressure roller, noted previously, swings upwardly through the aperture 31 to a generally vertical axis position wherein it presses the playing loop 13 of the tape coil 12 into engagement with the driving capstan, not shown.

As noted previously, when the driving mechanism for the tape coil is released, there is a tendency for the tape coil to continue rotating for a short period of time, and this often results in tape spillage and possible entanglement of the playing loop 13 within the cartridge. Also, during shipment and handling of the cartridge itself, it is desirable to prevent tape spillage due to movement and knocking about of the cartridge. Therefore, in accordance with the present invention, a brake mechanism is provided for the tape cartridge for engaging the tape coil 12 and stopping the movement thereof whenever the pressure roller mechanism, not shown, is disengaged from the cartridge. The braking mechanism comprises an elongated brake band 32 formed from a flexible material, such as polyethylene, and disposed adjacent the outer convolution of the tape coil 12 and extending in a generally arcuate configuration around a portion of the periphery of the tape coil 12, as shown particularly in FIGS. 1 and 2.

Figure 7:
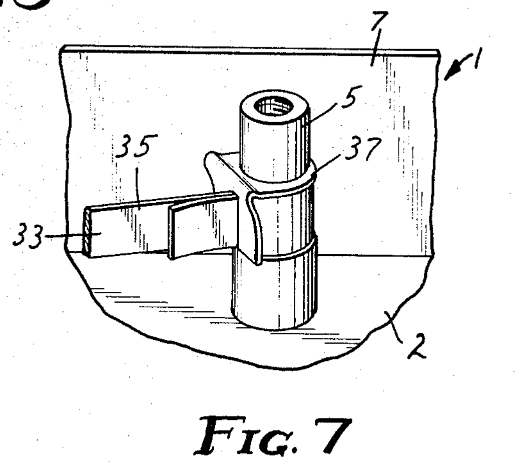
FIG. 7 is an enlarged view in perspective of the anchor pin for the other end of the brake band.

The end portion 33 of the brake band 32 disposed adjacent the aperture 31 in the housing bottom wall 2 is connected to an actuating lever, represented generally by the reference numeral 34. The other end portion 35 of the brake band 32 is securely anchored adjacent the front wall 7 of the cartridge housing 1 by means of one of the studs 5 secured to the cartridge bottom wall 2. Although the end portion 35 may be secured to the cartridge housing in any suitable manner, FIG. 7 illustrates an apertured clip 37 which is received on the stud 5 and secures by a clamping action the looped or doubled end portion 35 of the brake band 32.

Figure 6:
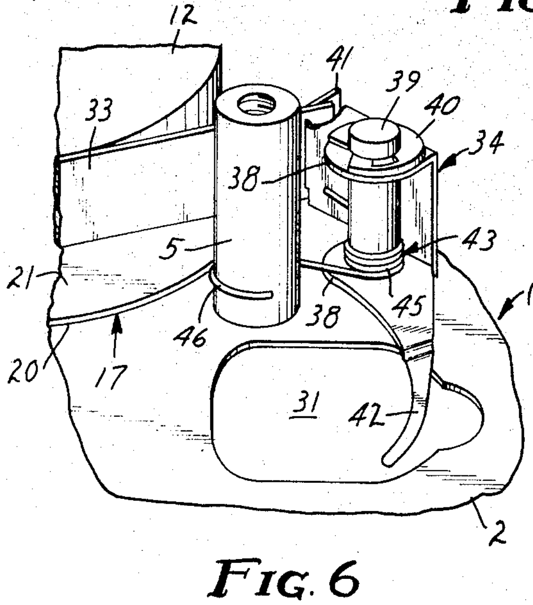
FIG. 6 is an enlarged view in perspective of the actuating lever for one end of the brake band mechanism.

An intermediate portion of the actuating lever 34 defines a pair of bearing ears 38 having aligned apertures received on a spindle 39 which projects upwardly from the housing bottom wall 2. The actuating lever 34 is secured on the spindle 39 by means of a spring clip nut 40 whereby the lever 34 is mounted for pivotal movements about the axis of the spindle 39. The rear end portion of the actuating lever 34 defines a hook 41 which is hooked through an aperture defined in the end portion 33 of the brake band 32, as shown particularly in FIGS. 1 and 6. The other end portion of the actuating lever 34 defines an elongated finger 42 which projects laterally outwardly over the adjacent aperture 31, in the housing bottom wall 2, as shown particularly in FIGS. 1 and 6. The finger 42 of the actuating lever 34 is thereby located in the path of travel of the pressure roller shaft or mechanism, not shown, of the tape machine when the pressure roller is swung up through the aperture 31 to its operative position adjacent the capstan, not shown. With this arrangement, when the pressure roller is moved to its above deck generally vertical axis position, the shaft thereof will engage the finger 42 of the actuating lever 34 and move the same to the position shown in FIG. 2 so as to pivot the lever 34 about its axis and move the brake band 32 to a released or inoperative position also shown in FIG. 2. In the released or inoperative position of the brake band 32 shown in FIG. 2, the tape coil 12 and the reel 17 are free to rotate about the spindle 18 pursuant to the driving action imparted to the playing loop 13 by the capstan and operatively positioned pressure roller, not shown. However, when the pressure roller is moved away from the playing loop 13 towards its below-deck inoperative position, not shown, the bias imparted to the actuating lever 34 and the brake band 32 by means of a coil spring 43 causes the actuating lever 34 and the brake band 32 to assume the operative or engaged position shown in FIG. 1. The coil spring 43 is shown particularly in FIG. 6 and includes a coil portion 45 received on the spindle 39, and end portion abutting against the actuating lever 34, and a hook end portion 46 engaged about a stud 5. With this arrangement, the coil spring 43 biases the actuating lever 34 and the brake band 32 toward the position shown in FIG. 1 whereby the brake band 32 exerts a braking pressure against the outer surface of the outer convolution of the tape coil 12.

Figure 4:
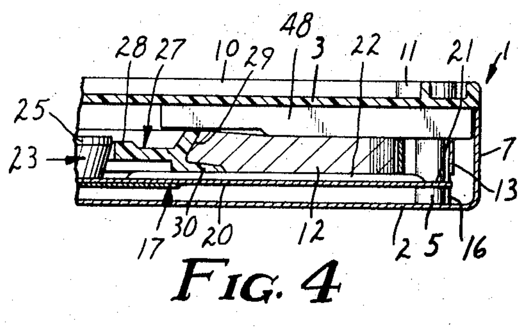
FIG. 4 is an enlarged view in vertical section taken on the line 4—4 of FIG. 1.
Figure 3:
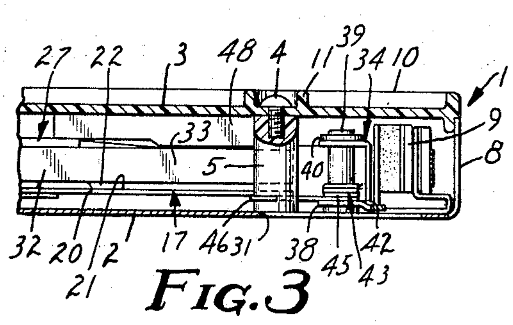
FIG. 3 is an enlarged view in vertical section taken approximately on the line 3—3 of FIG. 1, some parts being broken away.

Another feature of the present invention resides in the position of the plurality of generally radially extending ribs 48 which project downwardly from the cartridge top wall 3 to engage and align the upper edges of the tape coil 12. The ribs 48 may be formed integrally with the housing top wall 3 and as shown in FIGS. 3–5, the ribs 48 maintain a tape coil 12 evenly convoluted on the reel 17. The ribs 48 extend inwardly to the frusto-conical surface 29 of the reel core member 27, as shown particularly in FIG. 1. The inner end portions of the ribs 48 are upwardly recessed or cut away so as to be of a reduced thickness adjacent the innermost convolutions of the coil 12 which ride upon the peripheral flange 30 of the reel core member 27.

Figure 8:
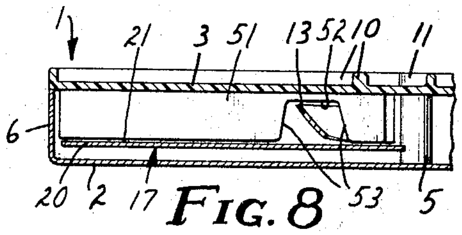
FIG. 8 is an enlarged view in section taken on the line 8—8 of FIG. 1.

The housing top wall 3 also defines a pair of supplemental ribs 50 for aligning the outermost convolutions of the tape coil 12, as shown in FIG. 1. The supplemental ribs 50 are located on opposite sides of the coil 12, one being located at the position where the playing loop 13 rejoins the outer convolution of the coil 12, and the other being positioned on the opposite side of the coil 12 above an intermediate portion of the brake band 32. An arcuate retainer flange 51 projects downwardly from the housing top wall 3 and is located at the position where the playing loop 13 leaves the innermost convolution of the tape coil 12, as shown particularly in FIGS. 1 and 8. The flange 51 defines a downwardly opening slot 52 through which the playing loop 13 passes, the opposite sides 53 of the slot 52 being angularly inclined or upwardly converging for guiding the playing loop 13 through the slot 52. The retainer flange 51 is located over the extreme outer edge of the turntable 20 and serves to retain the outermost convolutions of the tape coil 12 on the turntable 20, if the same should become loosely convoluted outwardly toward the outer edge of the turntable 20. The ribs 48, 50 also serve to prevent tape spillage during shipment and handling of the cartridge.

A cartridge made in accordance with the present invention has been tested and found to be completely satisfactory and to provide improved performance over previous designs. While a preferred embodiment incorporating the principles of the present invention has been shown and described herein, it should be specifically understood that the same may be modified without departure from the scope and spirit of the appended claim.

What we claim is:

A tape cartridge for use with a tape handling machine of the type having a power driven capstan and a cooperating idle pressure roller mechanism swingably mounted for movements between a below-deck inoperative position and an above-deck operative position, said cartridge comprising:

(a) a housing having top and bottom walls and wherein the bottom wall defines an aperture adapted to receive the pressure roller when said cartridge is operatively positioned on said machine, (b) a reel mounted for rotation within said housing and carrying a coil of tape convoluted on said reel, (c) a brake mechanism disposed within said housing for engaging said tape coil and stopping the movement thereof, said brake mechanism comprising:

(1) an elongated brake band disposed adjacent the outer convolution of said coil and extending in a generally arcuate configuration around a portion of the periphery of said coil and with one end thereof being disposed generally adjacent the aperture in said housing bottom wall, (2) an anchor secured to said cartridge housing and carrying the other end of said band, (3) means mounting said brake band within said housing for movements between a released position and an engaged position wherein said band presses against the outer surface of the outer convolution of said coil of tape, (4) said means including an actuating lever disposed adjacent said one end of said band and pivotally mounted at an intermediate portion thereof for movements about an axis extending generally perpendicular to said housing top and bottom walls, one end portion of said lever carrying said one end of said brake band and the other end portion of said lever being located in the path of travel of said pressure roller mechanism when the pressure roller is swung up through said cartridge aperture to its operative position, whereby upon engagement of said lever by said pressure roller mechanism said brake band is moved to its released position to permit rotation of said tape coil when the pressure roller is in its operative position.

References Cited

UNITED STATES PATENTS

| | | | |
|---|---|---|---|
| 2,499,895 | 3/1950 | Walker | 242—55.13 |
| 2,876,005 | 3/1959 | Eash | 242—55.19 X |
| 3,027,112 | 3/1962 | Flan | 242—55.19 X |
| 3,065,310 | 11/1962 | Cross | 242—55.13 X |
| 3,075,427 | 1/1963 | Salzmann | 242—55.13 X |
| 3,161,362 | 12/1964 | Smith | 242—55.19 |
| 3,269,671 | 8/1966 | Cole | 242—55.19 |

FRANK J. COHEN, *Primary Examiner.*

B. S. TAYLOR, *Examiner.*